US009143419B2

(12) United States Patent
 Sampath et al.

(10) Patent No.: US 9,143,419 B2
(45) Date of Patent: Sep. 22, 2015

(54) MEASURING FLOW ACTIVITY ON AN OPENFLOW ENABLED NETWORK DEVICE

(71) Applicant: Hewlett-Packard Development Company, L.P., Houston, TX (US)

(72) Inventors: Rangaprasad Sampath, Bangalore (IN);
 Ankita Agrawal, Bangalore (IN);
 Radhakrishnan Sivaraman, Bangalore (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 102 days.

(21) Appl. No.: 13/966,010

(22) Filed: Aug. 13, 2013

(65) Prior Publication Data

US 2014/0369228 A1 Dec. 18, 2014

(30) Foreign Application Priority Data

Jun. 14, 2013 (IN) ............................ 2592/CHE/2013

(51) Int. Cl.
 *G01R 31/08* (2006.01)
 *H04L 12/26* (2006.01)
(52) U.S. Cl.
 CPC .......... *H04L 43/0894* (2013.01); *H04L 43/062* (2013.01); *H04L 43/14* (2013.01)
(58) Field of Classification Search
 None
 See application file for complete search history.

(56) References Cited

U.S. PATENT DOCUMENTS

| 6,356,551 | B1 * | 3/2002 | Egbert ........................... 370/389 |
| 6,760,305 | B1 | 7/2004 | Pasternak et al. |
| 7,031,302 | B1 | 4/2006 | Malalur |
| 2011/0176544 | A1 * | 7/2011 | Wong et al. .................... 370/390 |
| 2012/0252458 | A1 | 10/2012 | Ohnishi |
| 2012/0287791 | A1 | 11/2012 | Xi et al. |
| 2013/0003574 | A1 * | 1/2013 | Hayashi et al. ................ 370/252 |
| 2013/0010600 | A1 | 1/2013 | Jocha et al. |

FOREIGN PATENT DOCUMENTS

WO WO01/01724 1/2001

OTHER PUBLICATIONS

Pavle Vujosevic, (Student), Salvatore Spadaro (Mentor), "Investigation and Validation of the Openflow Protocol for Next Generation Converged Optical Networks", Master Thesis Report, Universitat Politecnica de Catalunya, Barcelona, Spain, Jul. 2011.
"OpenFlow Switch Specification", Version 1.3.0 (Wire Protocol 0x04), Open Networking Foundation, Jun. 25, 2012.
"Software-Defined Networking: The New Norm for Networks", Open Networking Foundation, ONF White Paper, Apr. 13, 2012.
"The Least Recently Used (LRU) Page Replacement Algorithm", 2002.
McKeown, Nick, et al., "OpenFlow: Enabling Innovation in Campus Networks", ACM SIGCOMM Computer Communication Review, vol. 38, No. 2, Apr. 2008.
Mogul, Jeffrey C., et al., "Hey, You Darned Counters! Get Off My ASIC!", HotSD' 12, Aug. 13, 2012, Helsinki, Finland, ACM 2012.

* cited by examiner

*Primary Examiner* — Kibrom T Hailu
(74) *Attorney, Agent, or Firm* — Hewlett-Packard Patent Department (57) ABSTRACT

Flow activity is measured on a network device which may be OpenFlow-enabled. A hardware table on the network device, wherein the hardware table includes a record for each flow entry and a hit bit corresponding to each flow entry, is polled for determining status of the hit bit corresponding to each flow entry. An activity measure is updated with the status of the hit bit corresponding to each flow entry.

16 Claims, 6 Drawing Sheets

302 — poll a hardware table on a network device, wherein the hardware table includes a record for each flow entry and a hit bit corresponding to each flow entry, to determine status of the hit bit corresponding to each flow entry 304 — update an activity measure with the status of the hit bit corresponding to each flow entry

| Flow | After 5 seconds | After 10 seconds | After 15 seconds |
|---|---|---|---|
| Flow 1 | 0x00000000 | 0x80000000 | 0xC0000000 |
| Flow 2 | 0x00000000 | 0x80000000 | 0x40000000 |
| Flow 3 | 0x00000000 | 0x00000000 | 0x00000000 |

| Flow | 10 sec | 20 sec | 30 sec | 40 sec | 50 sec |
|---|---|---|---|---|---|
| 1 | 0xC0 (192) | 0xF0 (240) | 0x3C (60) | 0x1E (30) | 0x0F (15) |
| 2 | 0x40 (64) | 0x50 (80) | 0x54 (84) | 0xAA (170) | 0x55 (85) |
| 3 | 0xC0 (192) | 0xF0 (240) | 0xFC (252) | 0xFE (254) | 0xFF (255) |
| 4 | 0x7F (127) | 0x1F (31) | 0x07 (7) | 0x03 (3) | 0x01 (1) |

MEASURING FLOW ACTIVITY ON AN OPENFLOW ENABLED NETWORK DEVICE

CLAIM FOR PRIORITY

The present application claims priority under 35 U.S.C 119(a)-(d) to Indian Patent application number 2592/CHE/2013, filed on Jun. 14, 2013, which is incorporated by reference herein in its entirety.

BACKGROUND

Software-defined networking (SDN) is an approach to computer networking in which control is decoupled from the underlying network infrastructure. In software-defined networking architecture, the control plane is implemented in software, separate from the network equipment, and the data plane is implemented in the network equipment. OpenFlow is a leading protocol for SDN architecture. In an OpenFlow based network, data forwarding on a network device is controlled through flow table entries populated by an OpenFlow controller that manages the control plane for that network.

BRIEF DESCRIPTION OF THE DRAWINGS

For a better understanding of the solution, embodiments will now be described, purely by way of example, with reference to the accompanying drawings, in which.

DETAILED DESCRIPTION OF THE INVENTION

In software-defined networking (SDN), the network control plane can be physically decoupled from the data forwarding plane. For instance, a network switch can forward packets and a separate server can run the network control plane. OpenFlow provides a standard interface for the control plane to communicate with the data plane.

In an OpenFlow based network, a network device that receives packets on its interfaces looks up its flow table to check the actions that need to be taken on a received frame. Each flow table comprises of flow entries. And each flow table entry includes many components such as match fields, priority, counters, instructions, etc. If a packet matches a flow entry in a flow table, the counters associated with the matched flow entry are updated and the instructions associated with the matched flow entry are applied to the packet. Thus, counters can provide valuable information about flow activity on a switch and help in building the global traffic view on an OpenFlow controller.

OpenFlow specification prescribes the use of per-flow entry counters on the switch data plane i.e. Application-Specific Integrated Circuit (ASIC). (As per OpenFlow specification Version 1.3.1 (available at www.opennetworking.org), four types of per-flow entry counters are specified. These include received packets, received bytes, duration (seconds), and duration (nanoseconds)). However, most current ASIC architectures (for example, network switches) do not provide per-flow counters in the hardware tables and even if they do, the counters do not match up to the maximum number of OpenFlow flows that can be supported in that table. Additionally, implementing per-flow counters in the hardware of devices that support OpenFlow is a costly proposition.

Proposed is a solution that could provide various insights related to network traffic based on hit bits supported on hardware tables of present generation ASICs. Proposed solution provides an alternative to per flow counters specified in the OpenFlow specification. It could be used in ASIC architectures (of network devices) that do not provide support for per flow OpenFlow counters of the OpenFlow specification.

Figure 1:
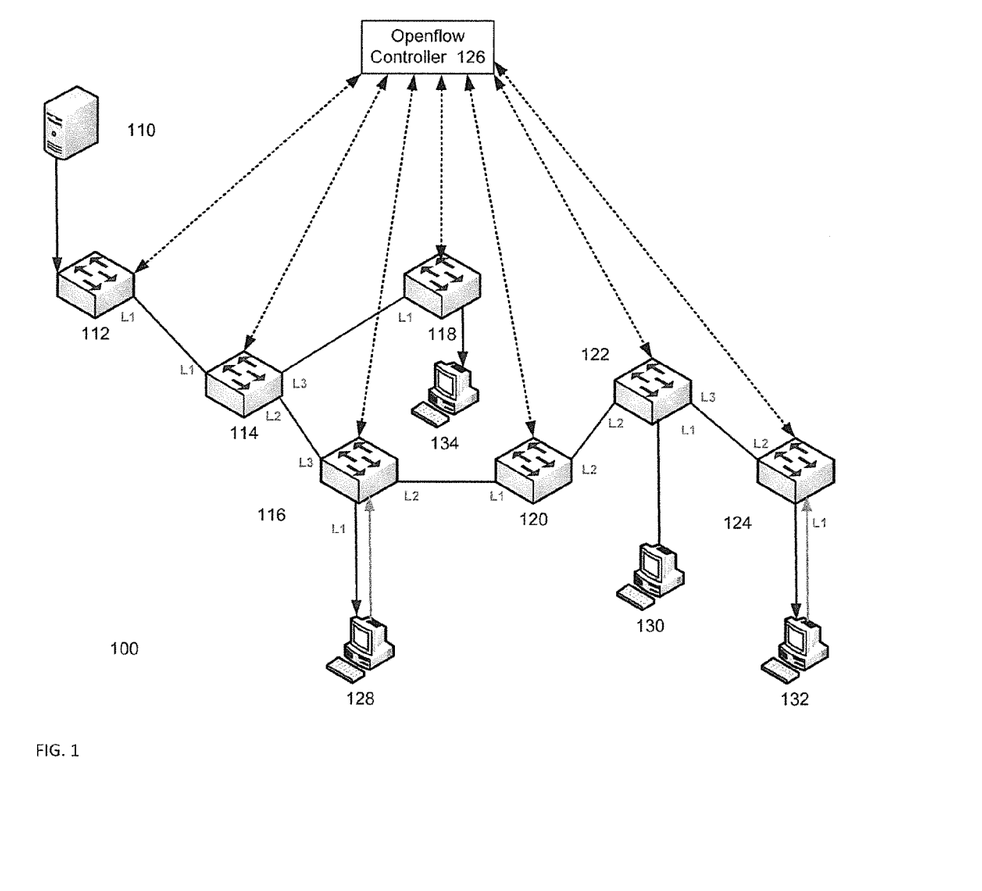
FIG. 1 is a schematic block diagram of a network system based on Software-defined Networking (SDN) architecture, according to an example.

FIG. 1, is a schematic block diagram of a network system based on Software-defined Networking (SDN) architecture, according to an example.

Network system 100 includes a source system 110, network devices 112, 114, 116, 118, 120, 122, 124, OpenFlow controller system 126 and host computer systems 128, 130, 132.

OpenFlow controller system 126 is connected to network devices 112, 114, 116, 118, 120, 122, 124, source system 110 and host computer systems 128, 130, 132 through a network, which may be wired or wireless. The network may be a public network, such as the Internet, or a private network, such as an intranet. The number of network devices and other components depicted in FIG. 1 is by way of example and not limitation.

Source system 110 is a computing system (for example, a computer server, a desktop computer, and the like) that may be a source of data packets in network system 100. For example, in an implementation, source system 100 may host multicast content.

Network devices 112, 114, 116, 118, 120, 122, 124 may be, but not limited to, a network switch, virtual switch, or router (for example, an edge router, a subscriber edge router, an Inter-provider Border Router or a core router). In an implementation, network devices 112, 114, 116, 118, 120, 122, 124 are OpenFlow enabled devices. Network devices 112, 114, 116, 118, 120, 122, 124 transfer data between end systems.

OpenFlow controller system 126 is software (machine executable instructions) which controls OpenFlow logical switches via the OpenFlow protocol. More information regarding the OpenFlow controller can be obtained, for instance, from web link www.opennetworking.org. OpenFlow is an open standard communications protocol that gives access to the forwarding plane of a network switch or router over a network. It provides an open protocol to program a flow table in a network device (such as, a router) thereby controlling the way data packets are routed in a network. Through OpenFlow, the data and control logic of a network device are separated, and the control logic is moved to an external controller such as OpenFlow controller system 126. The OpenFlow controller system 126 maintains all of network rules and distributes the appropriate instructions to network devices 112, 114, 116, 118, 120, 122, 124. It essentially centralizes the network intelligence, while the network maintains a distributed forwarding plane through OpenFlow-enabled network devices.

Host computer system 128, 130, 132 may be a desktop computer, notebook computer, tablet computer, computer server, mobile phone, personal digital assistant (PDA), and the like. In an example, host computer system 128, 130, 132 may include a client or multicast application for receiving multicast data from a source system 110 hosting multicast content.

Figure 2:
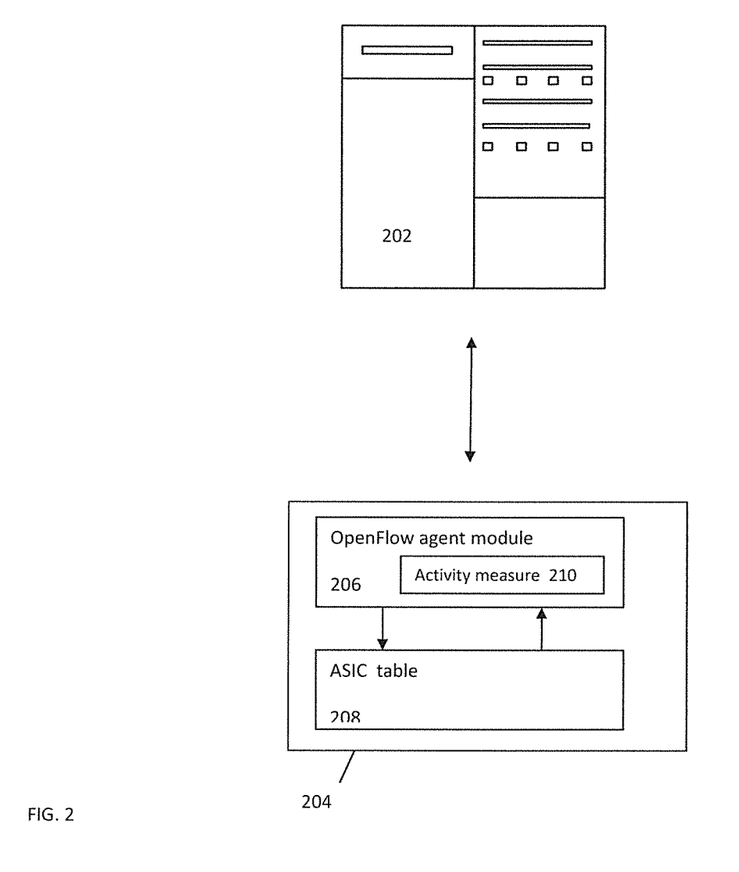
FIG. 2 is a schematic block diagram of a system for measuring flow activity on an OpenFlow enabled network device, according to an example.

FIG. 2 is a schematic block diagram of a system for measuring flow activity on an OpenFlow enabled network device, according to an example.

System 200 includes OpenFlow controller 202 (such as OpenFlow controller system 126 of FIG. 1) and network device 204 (such as a network device illustrated in FIG. 1). OpenFlow controller 202 may be connected to network device 204 through a network, which may be wired or wireless. In an implementation, OpenFlow controller 202 is a computer application (machine executable instructions) hosted on a computer server, which controls network device 204 via the OpenFlow protocol.

Network device 204 includes an OpenFlow agent module 206 and ASIC table 208. Network device 204 may be, but not limited to, a network switch, virtual switch, or router. In an implementation, network device 204 is an OpenFlow enabled device. Also, in an implementation, network device 204 does not support per flow entry counters specifies in the OpenFlow specification.

ASIC table 208 is a hardware table which may be present in an ASIC on network device 204. In an implementation, ASIC table 208 includes a record for each flow entry and a hit bit corresponding to each flow entry. A hit bit related to a flow entry is set if incoming traffic matches that flow entry. A hit bit may be cleared at a predefined refresh interval i.e. a periodic interval at which all the entries in a table are polled and hit bits are reset. Different ASIC tables may support different minimum and maximum refresh interval rates.

OpenFlow agent module 206 acts as an interface between OpenFlow controller system 202 and ASIC table 208. In an implementation, OpenFlow agent module 206 exposes a flow to ASIC table 208, captures information from hits bits of flow entries in ASIC table 208 and shares that information via the OpenFlow protocol to OpenFlow controller system 202. The information captured from hits bits of flow entries in ASIC table 208 may be stored in a data structure (such as a table) maintained by OpenFlow agent module 206. OpenFlow agent 206 includes an activity measure 210 for each flow entry on the network device. After polling of ASIC table 208 on network device 204, activity measure 210 is updated with the status of the hit bit corresponding to each flow entry.

Figure 3:
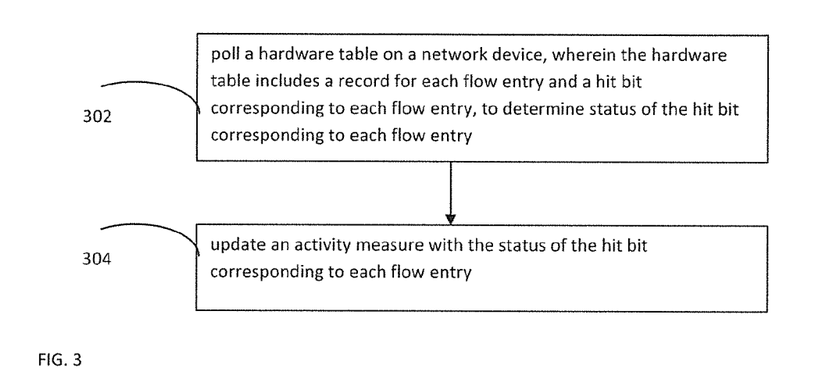
FIG. 3 shows a flow chart of a method of measuring flow activity on an OpenFlow enabled network device, according to an example.

FIG. 3 shows a flow chart of a method of measuring flow activity on an OpenFlow enabled network device, according to an example.

The proposed method could be implemented in a software-defined network, which in an implementation may be based on OpenFlow protocol.

Figure 4:
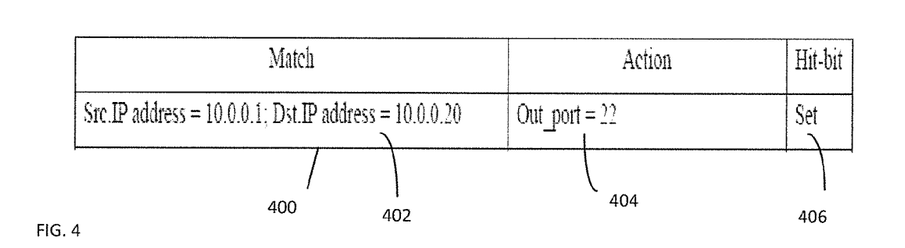
FIG. 4 illustrates a flow entry in a hardware table, according to an example.

At block 302, a hardware table on a network device in a software-defined network is polled for determining status of a hit bit corresponding to a flow entry maintained in the hardware table. As mentioned earlier, a hardware table may include records for all flow entries on a network device and a hit bit corresponding to each flow entry. FIG. 4 illustrates a flow entry in a hardware table, according to an example. Hardware table 400 includes flow entry 402, instruction related to the flow entry in case a match occurs 404, and hit bit status ("set") 406. In case of a plurality of flow entries in the hardware table, status of each hit bit corresponding to a flow entry is determined upon polling.

Figure 5:
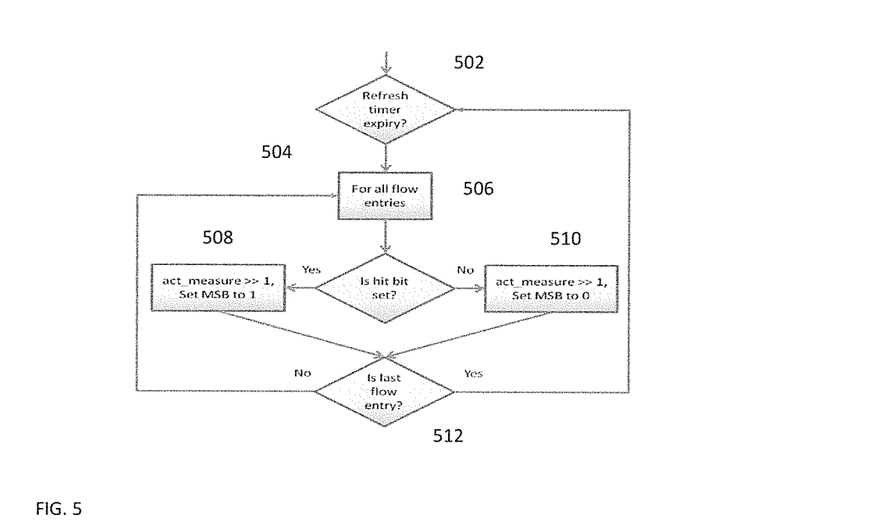
FIG. 5 illustrates a method of polling a hardware table on a network device, according to an example.

In an implementation, polling of a hardware table on the network device may be carried out, according to an example, by a method illustrated in FIG. 5. At block 504, polling is carried out for all flow entries in the hardware table. Polling may be performed at a predetermined refresh interval (block 502). For instance, polling may be performed at the interval of 5 seconds, 10 seconds, 15 seconds, and the like. At every predetermined refresh interval, the activity measure is right shifted by 1 bit. At block 506, for each flow entry, a determination is made whether the hit bit corresponding to a flow entry is set. If the hit bit corresponding to a flow entry is set, most significant bit (MSB) of the activity measure is set to 1 (block 508). If the hit bit corresponding to a flow entry is not set, most significant bit (MSB) of the activity measure is set to 0 (block 510). If it is the last flow entry in the hardware table (block 512), the process waits for commencement of the predetermined refresh interval.

At block 304, a counter (may be termed as "activity measure") on the network device is updated with the status of the hit bit corresponding to each flow entry. Activity measure could be a 32 or 64 bit counter.

Figure 6:
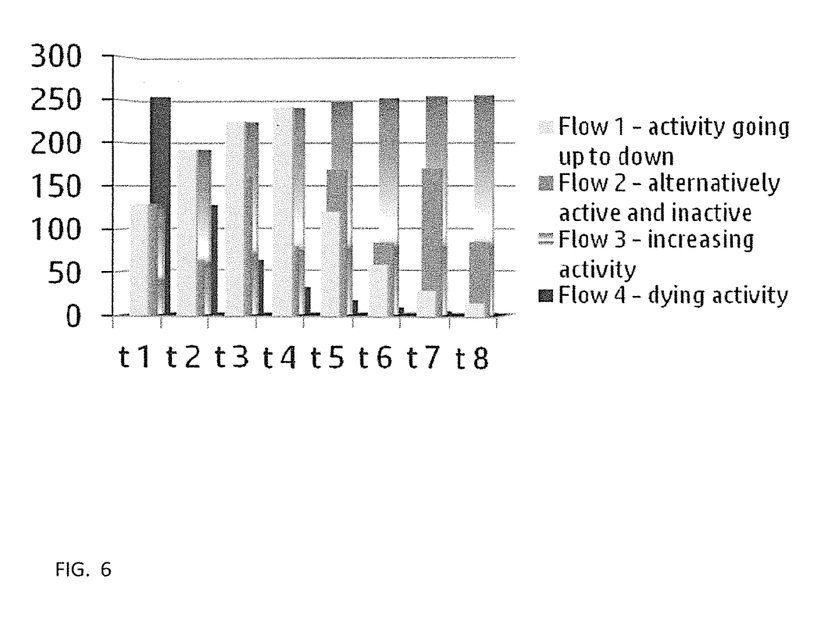
FIG. 6 illustrates an interpretation of an activity measure, according to an example.

In an implementation, the status of the hit bit, via an activity measure, corresponding to each flow entry may be shared with an OpenFlow controller (such as OpenFlow controller system of 126 of FIG. 1). The OpenFlow controller could analyze the shared data to obtain valuable network insights. By way of non-limiting examples, an OpenFlow controller could perform the following analyses: (a) which flows have been the most active over a period of time? (b) Which flows have not been active for the last n minutes? (c) When the flow table is full, which flows can be removed? An application could take advantage of the fact that some flows have been the least active and therefore remove them first to make room for new flow. (d) Are there flows that are active in certain intervals but inactive in certain others? Is there a pattern of activity that may be useful? (e) Do some flows occur in bursts? Such flows would be active in short intervals but remain largely idle otherwise. (f) After what point in time did a majority of flows start becoming active? This could indicate the time of day when a majority of employees logged in to start their day at work. (g) When did the activity of all flows matching a specific criterion drop? This could indicate say the outage of the network printer available on the floor or the outage of a default gateway. FIG. 6 illustrates an interpretation of activity measure, according to an example. In the graph shown in FIG. 6, the x-axis denotes time and the y-axis denote the activity measure value of a flow entry. An analysis of FIG. 6 indicates that in case of flow 1, the activity first increases before going down. In case of flow 2, the activity is alternatively active and inactive. For flow 3, the activity is increasing. In case of flow 4, the activity is dying. Thus, data shared with the OpenFlow controller can provide useful network information.

Figure 7:
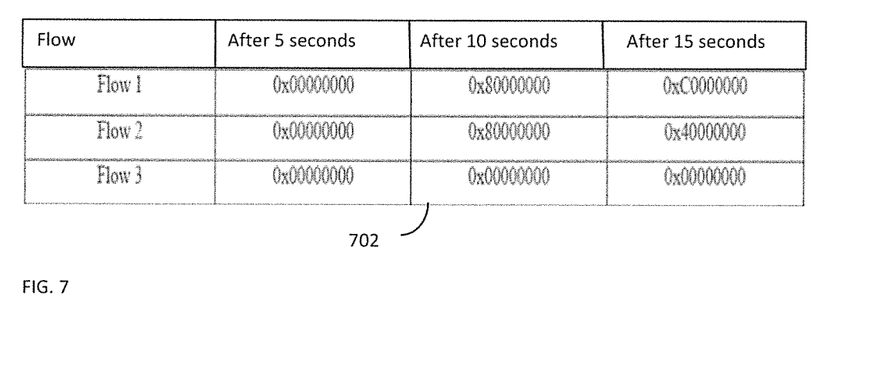
FIG. 7 illustrates a sample activity report, according to an example.
Figure 8:
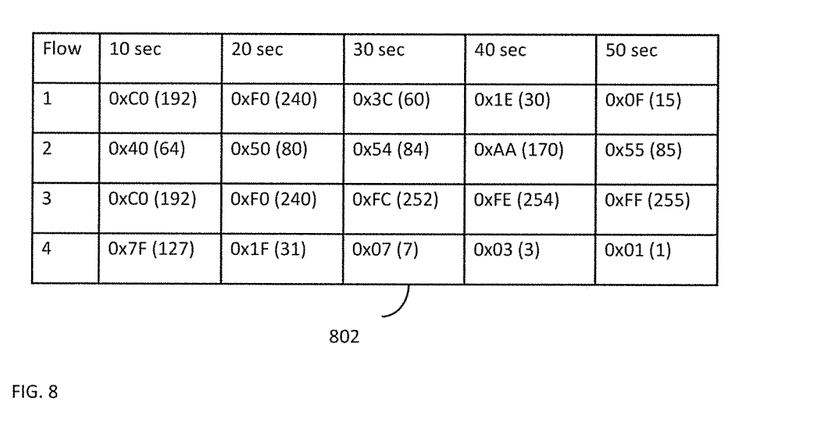
FIG. 8 illustrates an activity measure of different flows, according to an example.

FIG. 7 illustrates a sample activity report (based on activity measure) 702 that OpenFlow controller could make use of based on polling of the status of hit bit corresponding to flow entries in a hardware table, according to an example. An analysis of the data in report 702 indicates that Flow 1 is most active, flow 4 has never been active, and flow 3 has largely been idle except in a short time interval. FIG. 8 illustrates an activity measure of different flows, according to an example. Activity table illustrates an activity table 802 providing an activity measure of four different flows (1, 2, 3 and 4) at an interval of 10 seconds (i.e. between 10 and 50 seconds).

In an implementation, by way of example, OpenFlow specification may be amended to employ the solution described in this application. (There may be other implementations of the proposed solution as well). In the present implementation, it may require two activities.

One, the ability to support activity measures on a specific OpenFlow table needs to be announced to the OpenFlow controller. This may be carried out by adding a new property enum type 'OFPTFPT_ACT_MEASURE_SUPPORT' to the list "ofp_table_feature_prop_type enum" present in the OpenFlow specification. The following change (highlighted in "bold" font) shows the new enum type added to the standard list and its associated property definition.

```
enum ofp_table_feature_prop_type {
OFPTFPT_INSTRUCTIONS = 0, /* Instructions property. */
OFPTFPT_INSTRUCTIONS_MISS = 1, /* Instructions for table-miss. */
OFPTFPT_NEXT_TABLES = 2, /* Next Table property. */
OFPTFPT_NEXT_TABLES_MISS = 3, /* Next Table for table-miss. */
OFPTFPT_WRITE_ACTIONS = 4, /* Write Actions property. */
OFPTFPT_WRITE_ACTIONS_MISS = 5, /* Write Actions for table-miss. */
OFPTFPT_APPLY_ACTIONS = 6, /* Apply Actions property. */
OFPTFPT_APPLY_ACTIONS_MISS = 7, /* Apply Actions for table-miss. */
OFPTFPT_MATCH = 8, /* Match property. */
OFPTFPT_WILDCARDS = 10, /* Wildcards property. */
OFPTFPT_WRITE_SETFIELD = 12, /* Write Set-Field property. */
OFPTFPT_WRITE_SETFIELD_MISS = 13, /* Write Set-Field for table-miss. */
OFPTFPT_APPLY_SETFIELD = 14, /* Apply Set-Field property. */
OFPTFPT_APPLY_SETFIELD_MISS = 15, /* Apply Set-Field for table-miss. */
OFPTFPT_ACT_MEASURE_SUPPORT = 16, /* Activity measure support. */
OFPTFPT_EXPERIMENTER = 0xFFFE, /* Experimenter property. */
OFPTFPT_EXPERIMENTER_MISS = 0xFFFF, /* Experimenter for table-miss. */
};
```

The OFPTFPT_ACT_MEASURE_SUPPORT property could use the following property definition structure:

```
/* Activity measure support. */
struct ofp_table_feature_prop_activity_measure {
uint16_t type; /* OFPTFPT_TABLES_WITH_ACTIVITY_MEASURE */
uint16_t length; /* Length in bytes of this property. */
/* Is activity measure supported? */
bool is_supported;
uint8_t pad[3];
};
OFP_ASSERT(sizeof(struct ofp_table_feature_prop_activity_measure) == 8);
```

The second activity requires supporting activity measures on flow entries in the specific flow table (mentioned above). Additionally, the activity measures should be returned when queried by an OpenFlow controller. The ofp_flow_stats structure, listed in the OpenFlow specification, is returned to the OpenFlow controller in response to a query on flow statistics. A change highlighted below (in "bold" font) may be made to aforesaid structure in order to return information on per flow activity measures.

```
struct ofp_flow_stats {
uint16_t length; /* Length of this entry. */
uint8_t table_id; /* ID of table flow came from. */
uint8_t pad;
uint32_t duration_sec; /* Time flow has been alive in seconds. */
uint32_t duration_nsec; /* Time flow has been alive in nanoseconds beyond duration_sec. */
uint16_t priority; /* Priority of the entry. */
uint16_t idle_timeout; /* Number of seconds idle before expiration. */
uint16_t hard_timeout; /* Number of seconds before expiration. */
uint16_t flags; /* One of OFPFF_*. */
uint8_t pad2[4]; /* Align to 64-bits. */
uint64_t cookie; /* Opaque controller-issued identifier. */
uint64_t packet_count; /* Number of packets in flow. */
uint64_t byte_count; /* Number of bytes in flow. */
uint32_t activity_measure; /* Activity measure. */
uint8_t pad3[4];
struct ofp_match match; /* Description of fields. Variable size. */
//struct ofp_instruction instructions[0]; /* Instruction set. */
};
```

If a particular table implementation doesn't support activity measure, a value of zero may be returned to the OpenFlow controller as part of the OFPMP_FLOW reply message.

Solution described in this application may be implemented in the form of a computer program product including computer-executable instructions, such as program code, which may be run on any suitable computing environment in conjunction with a suitable operating system, such as Microsoft Windows, Linux or UNIX operating system. Embodiments within the scope of the present solution may also include program products comprising transitory or non-transitory processor-readable media for carrying or having computer-executable instructions or data structures stored thereon. Such processor-readable media can be any available media that can be accessed by a general purpose or special purpose computer. By way of example, such processor-readable media can comprise RAM, ROM, EPROM, EEPROM, CD-ROM, magnetic disk storage or other storage devices, or any other medium which can be used to carry or store desired program code in the form of computer-executable instructions and which can be accessed by a general purpose or special purpose computer.

For the sake of clarity, the term "module", as used in this document, may mean to include a software component, a hardware component or a combination thereof. A module may include, by way of example, components, such as software components, processes, tasks, co-routines, functions, attributes, procedures, drivers, firmware, data, databases, data structures, Application Specific Integrated Circuits (ASIC) and other computing devices. The module may reside on a volatile or non-volatile storage medium and configured to interact with a processor of a computer system.

It should be noted that the above-described embodiment of the present solution is for the purpose of illustration only. Although the solution has been described in conjunction with a specific embodiment thereof, numerous modifications are possible without materially departing from the teachings and advantages of the subject matter described herein. Other substitutions, modifications and changes may be made without departing from the spirit of the present solution.

We claim:

1. A method of measuring flow activity on a network device, comprising:
    polling a hardware table on the network device, wherein the hardware table includes a record for each flow entry and a hit bit corresponding to each flow entry, for determining a status of the hit bit corresponding to each flow entry, including determining whether the hit bit corresponding to each flow entry is set; and
    updating an activity measure with the status of the hit bit corresponding to each flow entry, including
        right shifting the activity measure by 1;
        if the hit bit corresponding to a flow entry is set, setting a predetermined bit of the activity measure to 1, and
        if the hit bit corresponding to a flow entry is not set, setting the predetermined bit of the activity measure to 0.

2. The method of claim 1, wherein
    setting the predetermined bit of the activity measure to 1 includes setting a most significant bit (MSB) of the activity measure to 1; and
    setting the predetermined bit of the activity measure to 0 includes setting the most significant bit (MSB) of the activity measure to 0.

3. The method of claim 1, further comprising recording the status of hit bit corresponding to each flow entry over a period of time.

4. The method of claim 1, further comprising sharing the status of the hit bit corresponding to each flow entry, via an activity measure value with a controller.

5. The method of claim 4, wherein the controller analyses the activity measure of each flow entry to identify most active flow over a period of time, identify inactive flows over a period of time or identify least active flows.

6. The method of claim 1, wherein polling of the hardware table is carried out at a predetermined refresh interval.

7. The method of claim 6, wherein the status of the hit bit corresponding to each flow entry is cleared at a commencement of the predetermined refresh interval.

8. A system, comprising:
    a controller;
    a network device coupled to the controller, comprising:
        a processor to capture an activity measure of each flow entry; and
        a table storing a record for each flow entry and a hit bit corresponding to each flow entry, wherein, to capture the activity measure of each flow entry, the processor is to:
            determine whether the hit bit corresponding to each flow entry in the table is set,
            right shift the activity measure by 1,
            if the hit bit corresponding to a flow entry is set, set a predetermined bit of the activity measure to 1, and
            if the hit bit corresponding to a flow entry is not set, set the predetermined bit of the activity measure to 0.

9. The system of claim 8, wherein the processor is to provide the activity measure of each flow entry to the controller.

10. The system of claim 8, wherein the controller analyses the activity measure of each flow entry to determine various flow parameters.

11. A network device, comprising:
    a processor;
    a non-transitory computer-readable medium storing instructions that when executed by the processor cause the processor to capture an activity measure of each flow entry; and
    a hardware table comprising a record for each flow entry and a hit bit corresponding to each flow entry,
    wherein, to capture the activity measure for each flow entry, the processor is to:
        determine whether the hit bit corresponding to each flow entry in the hardware table is set,
        right shift the activity measure by 1,
        if the hit bit corresponding to a flow entry is set, set a predetermined bit of the activity measure to 1, and
        if the hit bit corresponding to a flow entry is not set, set the predetermined bit of the activity measure to 0.

12. The network device of claim 11, wherein to set the predetermined bit of the activity measure to 1, the processor is to set a most significant bit (MSB) of the activity measure to 1, and
    to set the predetermined bit of the activity measure to 0, the processor is to set the most significant bit (MSB) of the activity measure to 0.

13. The network device of claim 11, wherein the network device is a network switch or router.

14. The network device of claim 11, wherein the activity measure is a 32 or 64 bit counter.

15. A non-transitory computer-readable medium storing machine executable instructions, the machine executable instructions when executed by a processor causes the processor to:
    poll a hardware table on a network device, wherein the hardware table includes a record for each flow entry on the network device and a hit bit corresponding to each flow entry, to determine a status of the hit bit corresponding to each flow entry; and
    update an activity measure of each flow entry on the network device with the status of the hit bit corresponding to each flow entry,
    wherein, to poll the hardware table, the processor is to determine whether the hit bit corresponding to each flow entry in the hardware table is set, and
    wherein, to update the activity measure of each flow entry, the processor is to:
        right shift the activity measure by 1;
        if the hit bit corresponding to a flow entry is set, set a predetermined bit of the activity measure to 1, and
        if the hit bit corresponding to a flow entry is not set, set the predetermined bit of the activity measure to 0.

16. The non-transitory computer-readable medium of claim 15, wherein to set the predetermined bit of the activity measure to 1, the processor is to set a most significant bit (MSB) of the activity measure to 1, and
    to set the predetermined bit of the activity measure to 0, the processor is to set the most significant bit (MSB) of the activity measure to 0.

* * * * *